United States Patent Office 3,414,333
Patented Dec. 3, 1968

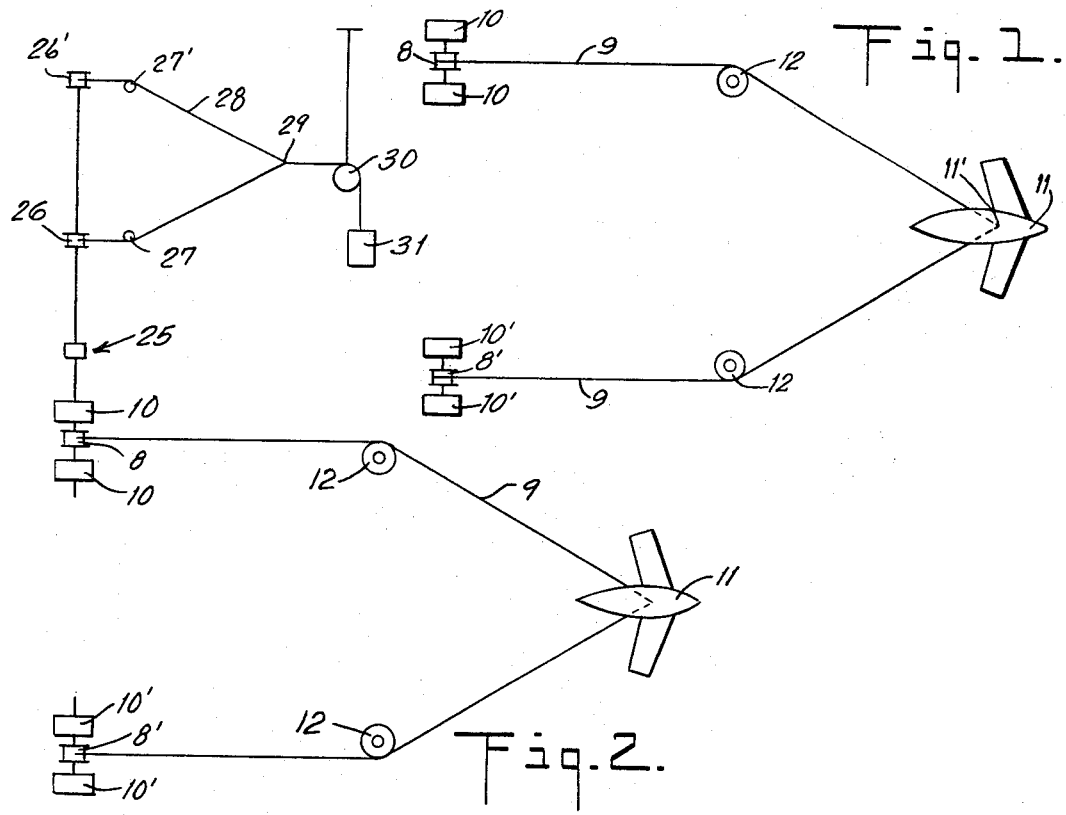

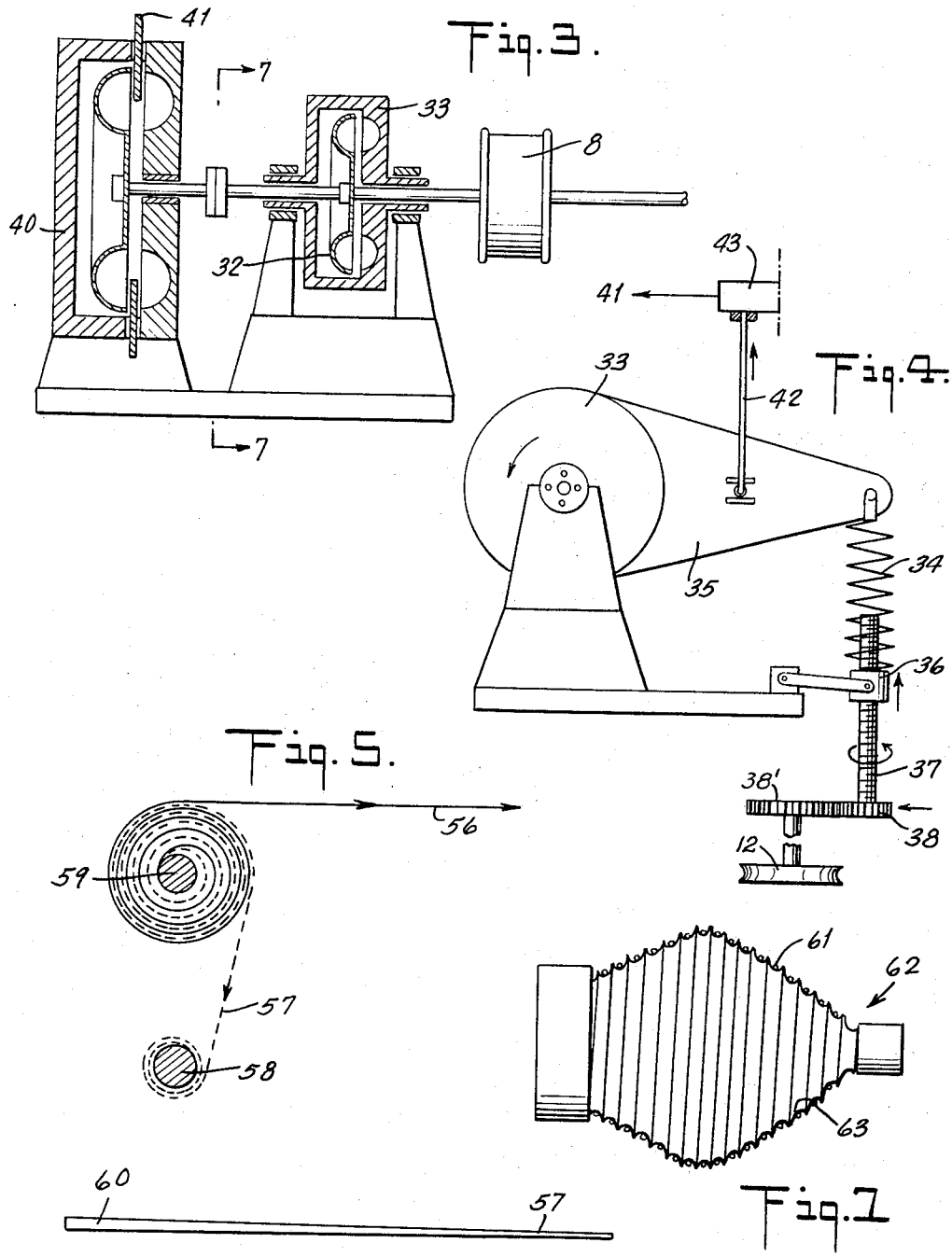

3,414,333
VEHICLE BRAKING SYSTEMS
Jean Merle, La Tronche, France, assignor to Societe Grenobloise d'Etudes et d'Applications Hydrauliques, and Societe Francaise Aeronautique et Maritime, both of Grenoble, Isere, Farnce, both corporations of France
Filed Jan. 27, 1965, Ser. No. 428,490
Claims priority, application France, Jan. 29, 1964, 4,647; Feb. 7, 1964, 4,648; Sept. 29, 1964, 4,725
16 Claims. (Cl. 303—21)

ABSTRACT OF THE DISCLOSURE

A method and braking system which embodies aircraft arresting gear connected to a hydraulic brake adjusted by variably positioned shutters. The shutters are controlled by the torque of an auxiliary hydraulic brake connected to the arresting gear.

---

The present invention relates to arrangements for ensuring the automatic braking and stopping of moving bodies of varying mass and initial velocity, within the shortest possible distance at the maximum permissible rates of deceleration.

It is known that ideal braking requires a constant deceleration of the moving body. In other words, the braking force $F=M\gamma$ which is applied to a moving body of given mass and initial velocity, must remain constant throughout its application. In order to decelerate moving bodies of varying mass and of constant or varying initial velocity under the requisite conditions, it is necessary that the braking force $F=M\gamma$ be matched automatically to each different moving mass and initial velocity.

In accordance with the present invention, the braking system embodies automatic devices by which the braking force is kept adjusted so as to ensure that the moving body is decelerated and brought to rest within the shortest possible distance, irrespective of its mass and its initial velocity, provided that the mass of such body and its initial velocity are within predetermined limits. These devices include torque-adjusting means whose action depend on the difference between the kinematic values of the actual movement of the moving body and the corresponding kinematic values of a nominal movement of the body which would satisfy the set conditions as regards maximum deceleration and maximum stopping distance. The kinematic elements of the movement from which the adjustment quantity is selected include the position of the moving body, and its instantaneous velocity and deceleration. The condition of the brake-adjusting means is then modified in accordance with this compared difference, to increase the braking torque on the moving body if the actual deceleration quantity fed into the system is less than the nominal value, and vice-versa, to decrease the braking torque on the moving body if the actual deceleration of such body is greater than the nominal value.

In the practice of the invention, the aforesaid results can be achieved by the use of known devices which are capable of giving a continuous response rate, that is to say, devices in which the brake adjusting means or component takes a definite position for each value of the difference, as for instance in conventional electricity generating units. On the other hand, arrangements which are capable of giving a simpler response rate can be used, as in those devices in which the brake adjusting component is normally in one or the other of two extreme positions, and rapidly switches from one position to the other whenever the governing difference changes sign.

The actual deceleration quantity fed into the system of this invention may be either the instantaneous deceleration of the moving body itself, if measurable directly, or if measurement can be effected through a kinematic transmission chain which will distort the movement of such body in accordance with a certain law (e.g. in terms of the position of the moving body), a deceleration quantity which is distinct and different from the deceleration of the moving body. If the actual deceleration quantity introduced into the system represents the true deceleration of the moving body, and if the nominal rate with which it is to be compared is constant, adjustment of the braking system can be effected by a direct comparison of the instantaneous moving body deceleration and the nominal rate. In such case, the brake adjustment device will be changed proportionately to increase the braking torque if the true deceleration is less than the nominal rate, and to decrease it in the contrary case.

Where the nominal value is not constant but depends on the position of the moving body, and also where the actual deceleration quantity is not the true deceleration of the moving body, but is one measured by a kinematic chain transmitting the motion in terms of the position of th moving body, one or the other of the following procedures is necessary:

Either (1) The nominal deceleration must be modified to keep it matched to the position of the moving body. The difference resulting from a comparison of the thus modified nominal rate and the deceleration actually measured, will then be used to actuate the brake control devices, or (2) The measured deceleration must be connected by an opposite kinematic chain so as to bring it back to the true deceleration of the moving body. The difference resulting from a comparison of such true deceleration with the nominal deceleration, will then be used to actuate the brake control devices.

In these cases where the entire braking system is an integral part of the vehicle e.g. railway locomotives, the true undistorted instantanous deceleration of the vehicle can be measured directly by accelerometers connected to the axles or wheels. On the other hand, where the braking system is provided on the ground, and is therefore exteriorly of the vehicle, as for instance in the case of an aircraft which is braked on landing by engagement with a cable unwinding from a drum incorporating a brake, it is difficult to measure the true deceleration of the aircraft, but it is a simple matter to measure the angular deceleration of the cable drum or one of the cable guide pulleys. While the deceleration measured in this way is not that of the aircraft, but depends on its instantaneous position, it is possible to accomplish the purposes of the invention by either of the two following procedures:

(1) Adjusting the deceleration in accordance with the aircraft's position, for instance, by controlling the drum or cable pulley angle of rotation and detecting the difference between the nominal deceleration thus adjusted and that actually measured on the drum or pulley; the braking torque being controlled by the said difference.

(2) Rectifying the angular deceleration measure on the drum or cable pulley by means of an inverse kinematic chain, in order to reconstitute the true deceleration of the aircraft, then comparing the said true deceleration and the nominal rate, and controlling the braking torque in accordance with the resulting difference of such comparison.

Where an instantaneous velocity is the governing quantity fed into the system of this invention, it may either be the velocity of the moving body, if this can be measured directly, or it may be the instantaneous velocity of one of the elements in a kinematic chain which connects the moving body to the braking unit. The nominal movement will be defined by the nominal velocity, which will depend on the position of the moving body—or which amounts to the same thing—on the position of one of the elements in the kinematic chain. The position of the brake-adjusting component will be then modified in accordance with the difference between the true instantaneous velocity and the corresponding nominal velocity in such manner that the braking torque increases if the instantaneous velocity exceeds the nominal, and vice-versa.

In both the above cases, the nominal movement is defined in terms of the limitations applicable to the true deceleration rates of the moving body (e.g. maximum deceleration, maximum braking distance, maximum loads on transmission components, etc.) and with due allowance for the following:

(1) The kinematic and dynamic characteristics of the braking equipment.

(2) The response rate of the adjusting equipment.

It is generally possible to determine from given factors an ideal nominal movement from which the actual nominal movement will generally differ because of unavoidable residual discrepancies between the true and nominal movements. Where, for instance, a maximum deceleration is determined, the ideal nominal movement, i.e. that one which, allowing for the deceleration limitation, results in the body being brought to rest within the shortest possible distance—would be a uniformly decelerated motion defined by the following:

either (i) a constant nominal deceleration equal to the maximum deceleration $\gamma M$ or (ii) a quadratic relationship between velocity and the position of the moving body, as follows:

$$V^2 = Vo^2 - 2\gamma Mx$$

where:

$V$=instantaneous velocity
$Vo$=initial velocity of the body when braking begins
$\gamma M$=maximum deceleration
$x$=aircraft position Such a nominal movement cannot generally be adopted in this case, because the residual governing errors would result in the deceleration/maximum deceleration ratio being momentarily exceeded. The actual nominal movement will generally be calculated by successive approximation, with the previously mentioned allowance for the characteristics of the braking equipment and the response rate of the governing system.

In those cases, where aircraft are braked by an arrester cable or band, the cable or band unwinding from a drum which also incorporates the brake, the quantities associated with position may be determined as follows:

$\alpha$=drum unwinding angle, as from an original position 0.
$x$=distance travelled by the aircraft after engaging with the arrester cable.
$y$=length of cable unwound after engagement of the aircraft.
$\theta$=bearing angle of the arrester hook with respect to the guide cable pulley centre.

The following quantities associated with the instantaneous velocity of the aircraft should also be considered:

$W_1$=angular velocity of the guide pulley or of any other pulley bearing against the band.
$W$=angular unwinding velocity of the drum, which is also equal or proportional to the hydraulic brake angular velocity.

Following are a few examples of how the above quantities can be detected:

(a) Measurement of the drum unwinding angle $\alpha$, by use of a revolution counter on the drum shaft.

(b) Measurement of the distance $x$ run by the aircraft, by use of an optical method employing a photoelectric cell, or by use of a cable unreeling at the same speed as the aircraft.

(c) The length $y$ of unwound cable may be measured by a revolution counter fitter to one of the guide pulley spindles, or to a pulley bearing against the cable.

(d) Measurement of the angular velocities $W_1$ and $W$, by use of revolution counters of the flyweight or generator type.

The combination and transmission to the control equipment of all the above quantities may be effected by such suitable known conventional systems as are required to ensure optimum braking conditions, for instance mechanical systems with levers, cams, springs, etc., hydraulic systems with servo-controls, pilot and distribution valves, etc. or electrical or electronic systems. The action of this equipment upon the brake control systems may either be direct, or effected through an amplifier where high operating forces are involved. Any type of brake may be employed in practicing the invention. In the present types of aircraft braking systems which are utilized on the ground, the constant-radius drum is braked by mechanical brakes. Hydraulic brakes are more advantageous, however, as they cost less, take up less room and afford a higher braking power. A particularly attractive feature of hydraulic brakes is that, for a given rotational speed, there is a definite relationship between the degree of pocket or blade opening and the braking torque, which is not the case in the use of mechanical brakes, for instance, where friction forces are at least partly unpredictable. However, hydraulic brakes alone cannot bring an aircraft to a complete stop and it is necessary to employ low-power mechanical brakes which are arranged to come into action during the very final stage of the landing run under the control of one of the previously mentioned feedback systems which is linked to the position of the aircraft. As with certain types of electrical brakes, the torque characteristics of hydraulic brakes are proportional to the square of the angular velocity ($W^2$), which, when such brakes are utilized with cable unwinding drums of constant radius, result in an initially violent and then rapidly decreasing braking effect, i.e. one very different from the one it is desired to achieve. A known arrangement which has been designed in an attempt to overcome these difficulties of the hydraulic brake includes a drum from which a band unwinds according to an Archimedean spiral, in which the required variation of radius $r$ is effected by an appropriate reduction in the number of wraps around the drum. In accordance with the present invention, however, a closer approximation to the required relationship can be achieved by using a band whose thickness varies in terms of $x$.

To illustrate the present invention, a number of examples will now be described, with reference to the diagrams illustrated in the accompanying drawings, in which FIG. 1 is a diagrammatic plan view of a braking system for aircraft on a runway.

FIG. 2 is a diagrammatic view showing an inverse kinematic chain or corrector unit embodied in the arrangement of FIG. 1.

FIG. 3 is a diagrammatic view in vetrical section showing how two hydraulic brakes may be embodied in the arrangement of FIGS. 1 and 2; the stator of one of such brakes being shown mounted in balance.

FIG. 4 is an end view of the arrangement shown in FIG. 3, the view being taken along the line 7—7 of FIG. 3.

FIG. 5 is a diagrammatic view showing an arrangement whereby the radius of an unwinding drum may be varied at a difinite rate.

FIG. 6 is a side elevational view of a variable-thickness brake band that may be employed in the construction of FIG. 5; and FIG. 7 is a plan view of a drum constructed to have its radius vary at a definite rate.

The system shown by way of illustration in FIG. 1 of the drawings comprises two braking units composed of drums 8, 8' on which the ends of an arrester band 9 are wound. Associated with each of the drums 8,8' are two brakes 10, 10 and 10', 10' respectively. The arrester band extends forwardly from the drums 8, 8' and passes over a pair of spaced pulleys 12, 12; the central portion of the arrester band extending transversely between the drums and across the path of a landing aircraft 11 provided with a suitable hooking device 11' for catching such portion of the arrester band. As indicated in FIG. 1 the plane on hooking the arrester band draws it over the pulleys 12 from the drums 8, 8'.

As the band 9 in the aforesaid arrangement is wound on itself on the drums 8, 8', its unwinding under the pull of the aircraft 11 being braked takes place with decreasing radius thereby applying to the plane a variable braking force which is dependent on the position of the plane along the runway. As, however, direct measurement of the aircraft deceleration is difficult with this type of arrangement, if such quantity is to be utilized, the angular deceleration of one of the drums 8, 8' or of one of the guide pulleys 12 is measured instead. As the drum or pulley and aircraft deceleration values are not the same, the invention contemplates utilizing as a kinematic transmission link between the aircraft 11 and the drum 8 or 8' or the pulley 12 whose angular deceleration is being measured, the band or cable 9 or such drum or pulley. This kinematic transmission link distorts the aircraft movement in a manner varying according to its position along the runway, so that the accelerometer coupled to the drum 8, or 8' or the pulley 12 does not measure the true aircraft deceleration, but a rate depending on its position along the runway.

The nominal deceleration therefore has to be modified according to the aircraft position by a corrector, which corrects it in terms of the angular position of the drum or guide pulley 12 being measured with relation to the aircraft position.

As is shown in FIG. 2 of the drawings, such corrector, which is in the nature of an inverse kinematic chain, is controlled by the rotation of one of the drums (drum 8) unwinding the arrester band 9. This rotation of drum 8 is transmitted through a coupling 25 to the corrector unit which is constituted of two additional drums 26, 26' on which wind in a spiral fashion the ends of a thin band 28. The two parts of band 28 pass over guide pulleys 27, 27' and are joined beyond such pulleys at a point 27 which, by uniform reduction of the geometrical elements of the principal connecting chain, is made to move in exact similarity with the movement of the aircraft 11. The movement of this point 29 is transformed to a rotary motion by a pulley 30 connected with an accelerometer system of a known pattern (not shown). A counterweight 31 is attached to the end of band 28 to produce sufficient tension thereon to ensure its unwinding from the drums 26, 26'.

As a result of the aforesaid arrangement which acts in the opposite direction to the kinematic transmission link or chain constituted of the cable 9 and drum 8, the deceleration quantity obtained from the drum 8, which is distorted with respect to that of the aircraft as has been previously pointed out, is corrected so that the true aircraft deceleration can be reproduced by measurement of the corrected deceleration value issuing from the correcter unit to the accelerator.

The nominal deceleration thus corrected in terms of the aircraft position and the rate measured by the accelerometer are continuously compared by a comparator unit, which actuates a goverver unit according to the deceleration difference to adjust the brakes 10, 10' in a manner necessary to bring the aircraft deceleration into line with the nominal rate.

Considering now the situation in which the four brakes 10 and 10' in the system shown in FIG. 1 are hydraulic brakes, it will be noted, as has beeen previously indicated, that the effective radius of the drum 8 or 8' decreases as the band 9 unwinds therefrom so that the brake speed of rotation decreases less than it would if the drum had a constant radius. A further result of this progressive reduction in radius is that the braking force applied to the cable will be greater for a given torque. These two distinct actions thus compensate the braking characteristics of hydraulic brakes—i.e., torque proportional to the square of angular velocity—so that there is applied to the aircraft a braking force F such that a practically constant aircraft deceleration curve is obtained.

FIGS. 3 and 4 of the drawings show an arrangement which may be employed in accordance with the invention for the braking of aircraft of different masses and landing speeds. The arrangement shown includes the drum 8 in the embodiments of FIGS. 1 and 2 and a hydraulic braking unit composed of a low-power hydraulic brake 32 unprovided with means of adjustment coupled to the drum 8 and associated with a balance-mounted stator 33. As shown in FIG. 4, the stator 33 is maintained in equilibrium by a spring 34 acting on the end of the stator arm 35 so as to balance the braking torque. The other end of spring 23 bears against a nut 36 movable along a threaded spindle 37. The torque of hydraulic brake 32 is determined by the equilibrium position of the stator or brake arm 35, and this torque is proportional to $W^2$, i.e., to the aircraft speed (the aircraft velocity parameter). The rotation of the threaded spindle 37 is controlled by a gear wheel 38 which is drivenly connected to the pulley 12 in FIG. 2 whose deceleration is being measured and which is drivenly connected to a pulley 12 in the embodiment of FIG. 1 and to pulley 30 in the embodiment of FIG. 2 and which moves at an appropriate rate determined by a suitable aircraft position detection system (not shown), for instance, by one of the methods previously described herein, and such that the position of the nut 36 against which the spring 34 bears will depend on the position of the aircraft. Thus, as is shown in FIG. 4 by way of example, an intermediate gear 38' keyed to the shaft of the pulley 12 in FIG. 1 entrains gear 38 at the speed of travel of the associated band 9. A similar connection of gear 38 with pulley 30 in FIG. 2 would move such gear at the speed of travel of the band 28. The movement of the brake 35 thus provide combined values of the aircraft position and velocity parameters.

As shown in FIG. 3 of the drawings, the drum 8 and the hydraulic brake 32 are coupled to a high-power second hydraulic brake 40 having a fixed stator and sliding shutters 41 or some other suitable torque adjusting device capable of restricting the passage of fluid between the brake rotor and stator. The portion of the balance-mounted stator lever arm 35 is connected to and controls the opening of the brake control shutters 41 through a rod 42 and servo mechanism 43, to keep the braking power of the two hydraulic brakes 32 and 40 adjusted in terms of the two parameters mentioned above. Even though the small hydraulic brake 32 is coupled to the larger hydraulic brake 40, it is capable of functioning along to brake light aircraft having a lower landing speed because the braking torque involved in stopping such aircraft is so small that the position of the brake arm 35 does not vary sufficiently to affect the control shutter 41 opening in the larger brake 40. The capacity of the smaller brake 32 is in itself insufficient to handle heavier aircraft landing at higher speeds. Thus, when such a larger aircraft is being decelerated, the brake 32 will accelerate until a point is reached at which its angular velocity W and hence also the torque $C=kW^2$ will have increased sufficiently to alter the position of the lever arm 35 according to the position of the aircraft along the runway, as determined by the position of the spring bearing nut 36. When the lever arm 35 is so moved, it will cause the opening of the control shutters 41 in the larger brake 40 to be so varied by the rod 42 and the servo mechanism 43, as to bring the larger brake 40 into operation, thereby reinforcing the braking action of the small brake 32 and automatically matching the braking power to the aircraft mass and initial velocity. A constant braking rate is thus achieved for any aircraft whose mass and initial velocity are within the assumed limits.

It will be understood that the foregoing is merely one example of how the invention may be practiced with hydraulic brakes. An alternative arrangement could be, for instance, to have one brake with its stator balance-mounted instead of two, and with sliding shutter controls actuated by the balanced lever arm. These shutters might be adjusted to provide a small opening when braking a light aircraft, a large opening for heavy aircraft, and intermediate openings for aircraft in the intermediate weight range. In another embodiment of the invention the control shutter can be made in the form of a plurality of individual small shutters designed on the "fully open or fully closed" principle, and in number dependent on the requisite number of stages in the full braking process, and each shutter controlling a small brake. In such a construction, the balance-mounted stator of the first brake would control the openings in the other brakes, either simultaneously, or each one in succession. A still further possibility would be to provide only a single brake assembly 8 and 10 in the layout of FIG. 1; the other brake assembly 8' and 10' being replaced by a fixed point and the aircraft engaging with the cable 9 by means of a pulley system. In this arrangement, the cable will unwind twice as fast, so that the brake can be made smaller, and the cable tension will be the same on either side of the aircraft.

FIG. 5 of the drawings shows a drum construction in which the radius varies at a predetermined rate. In this construction, the thickness of the arrester band 56 is constant and an insert strip 57 of varying thickness rolls up with the arrester band to provide the requisite variable radius. During a braking operation, the arrester band 56 and insert strip 57 unwind in the directions shown by the arrows on the diagram. The unwinding insert strip 57 winds up on a drum 58 geared—or linked in some other suitable fashion—to the primary drum 59. Due to the variation in radius of these two drums, the link between them must include some form of clutch, such as a hydraulic coupling.

It will be noted that in the construction of FIG. 5 the use of an insert strip of varying thickness does away with the need for a varying arrester band thickness, and is simpler to manufacture as it does not have to withstand any pull. FIG. 6 of the drawings illustrates the construction of the insert strip 57 of varying thickness; the thicker end 60 of such strip being positioned next to the hub of the drum 59 when the strip is wound thereon.

It is also possible to approximate the require constant deceleration over a wider range by having the arrester cable 61 wind up on a variable-radius drum 62 constructed in the manner shown in FIG. 7 of the drawings. The drum 62 is provided with helicoidal steps or grooves 63 formed in accordance with a spiral whose polar radius is a definite function of the unwinding angle, i.e., of the aircraft position, the said function being calculated beforehand to approximate the ideal braking rate as closely as possible.

I claim:

1. A method for automatically braking and stopping linearly moving bodies within the shortest possible distance with the maximum permissable deceleration, comprising the steps of applying to the linearly moving body a braking force for decelerating the linear movement of said body, successively measuring within the limits of such distance, quantities determined by the instantaneous position of said body and the instantaneous speed of said body at successive moments in the linear movement of the body, successively comparing such measured quantities with reference quantities established according to instantaneous positions and velocities of said body in a nominal linear movement of the body in accordance with given conditions of maximum deceleration within such stopping distance, generating successive correction quantities corresponding to any deviations between said measured quantities and said reference quantities, and supplying such corrective quantities to means for controlling the applied braking force, and operable to adjust the applied braking force in accordance with variations in such successive correction quantities to eliminate the deviations between said measured and reference quantities, thereby to bring the actual linear decelerating movement of the linearly moving body into line with the nominal linear decelerating movement of such body.

2. The method of claim 1 in which the reference quantities are estimated to cause an application to the moving body of a practically constant braking force, the magnitude of which is automatically matched to the mass and initial linear velocity of the body so as to achieve substantially the same given braking rate and constant deceleration in all cases.

3. The method of claim 1, in which the measured quantity is an angular deceleration quantity successively measured at said successive moments in the linear movement of the body, and in which the reference quantities are deceleration quantities having given values differing from the values of the measured deceleration quantities according to the position of the moving body and such as to provide a comparison between the measured deceleration and a nominal rate of deceleration modified in accordance with the position of the moving body.

4. The method of claim 3, in which the measured quantities are measured from a kinematic transmission link to the body, and in which such measured quantities are corrected to provide quantities representing the true linear deceleration of the body.

5. The method of claim 1, in which the measured quantities each represent the actual instantaneous linear velocity of the body at a given instantaneous position of the body within said stopping distance, and in which the reference quantities are established according to the velocities of the body at given instantaneous positions of the body in a nominal linear movement of such body within such distance.

6. In mechanism for automatically braking and stopping linearly moving bodies within the shortest possible distance with the maximum permissible deceleration, the combination of means for applying to a linearly moving body a braking force for decelerating the linear movement of said body, means connected to said body for successively measuring within the limits of such distance, quantities determined by the instantaneous position of said body and the instantaneous speed of said body at successive moments in the linear movement of the body and for transforming such measurements into successive actual reference quantities, means for generating successive reference quantities established according to instantaneous positions and velocities of said body in a nominal linear movement of the body in accordance with given conditions of maximum deceleration within such stopping distance, means associated with said connected and generating means for comparing the actual measured quantities with the reference quantities and for generating successive correction quantities corresponding to any deviations between such quantities, and brake control means controlled by such successive correction quantities and controlling said braking means, said brake control means being operable to adjust the braking force of said braking means in accordance with variations in the successive correction quantities in the sense of eliminating the deviation between the actual and measured reference quantities so as to bring the actual linear decelerating movement of the linearly moving body into line with the nominal linear decelerating movement of such body.

7. In mechanism as defined in claim 6, in which said connected means comprises kinematic transmission chain means connected to said linearly moving body.

8. In mechanism as defined in claim 7, in which said transmission chain means comprises a direct transmission chain connected to said moving body, and an inverse transmission chain located between said first chain and said comparing means.

9. In mechanism as defined in claim 6, in which said braking means comprises a drum and cable unit constructed to provide a substantially constant braking force.

10. In mechanism as defined in claim 9, in which said drum and cable unit comprises an arrester cable having a thickness which varies according to the position of the body being decelerated to effect a substantially constant braking of the latter.

11. In mechanism as defined in claim 10, in which said arrester cable is composed of an arrester band of constant thickness and an insert strip having a thickness varying according to the position of said body, said corrector band and insert strip being wound together on said drum with said insert strip interposed between all adjacent wraps of the arrester band on said drum.

12. In mechanism such as defined in claim 9, in which said drum and cable unit comprises a drum having a cable receiving body of variable radius and composed of helicoidal steps formed according to a spiral whose polar radius is a definite function of the unwinding angle dependent on the position of the body being decelerated to effect a substantially constant braking thereof.

13. In mechanism as defined in claim 6, in which said braking means comprises a hydraulic brake provided with a balance-mounted stator, in which said comparing means comprises a lever arm mounted on said stator, a member adjustable relative to said lever arm, and a spring seated between said member and said lever arm and biasing said arm in a direction to balance the braking torque of said hydraulic brake, and means for adjusting said member to a position comparable to the position of the body being decelerated.

14. In mechanism as defined in claim 13, in which said brake control means includes torque adjusting means for said hydraulic brake, means controlling the operations of said torque adjusting means, and means connected to said lever arm and operable on movement of the latter to actuate said controlling means.

15. In mechanism as defined in claim 14, in which said hydraulic brake is composed of a low power hydraulic brake and a high power hydraulic brake coupled to the former, said balance-mounted stator forming part of said low power brake, and said torque adjusting means being mounted on said high power brake.

16. In mechanism such as defined in claim 6, in which said connected means includes a kinematic transmission link to the body and measures from such link angular deceleration quantities at said successive moments in the linear movement of the body, and includes means for correcting the measured deceleration quantities to provide quantities representing the true linear decelerating of the body for transmission of said comparing means.

References Cited

UNITED STATES PATENTS

| | | | |
|---|---|---|---|
| 2,907,607 | 10/1959 | Williams | 303—21 |
| 3,172,504 | 3/1965 | Daniels | 188—90 |
| 3,181,819 | 5/1965 | Hayes | 244—63 |

FOREIGN PATENTS 529,660  6/1955  Italy.

MILTON BUCHLER, *Primary Examiner.*

J. J. McLAUGHLIN, *Assistant Examiner.*